May 7, 1935. J. C. WALKER 2,000,725
BREAKING OF OIL-WATER EMULSIONS
Filed Dec. 5, 1921
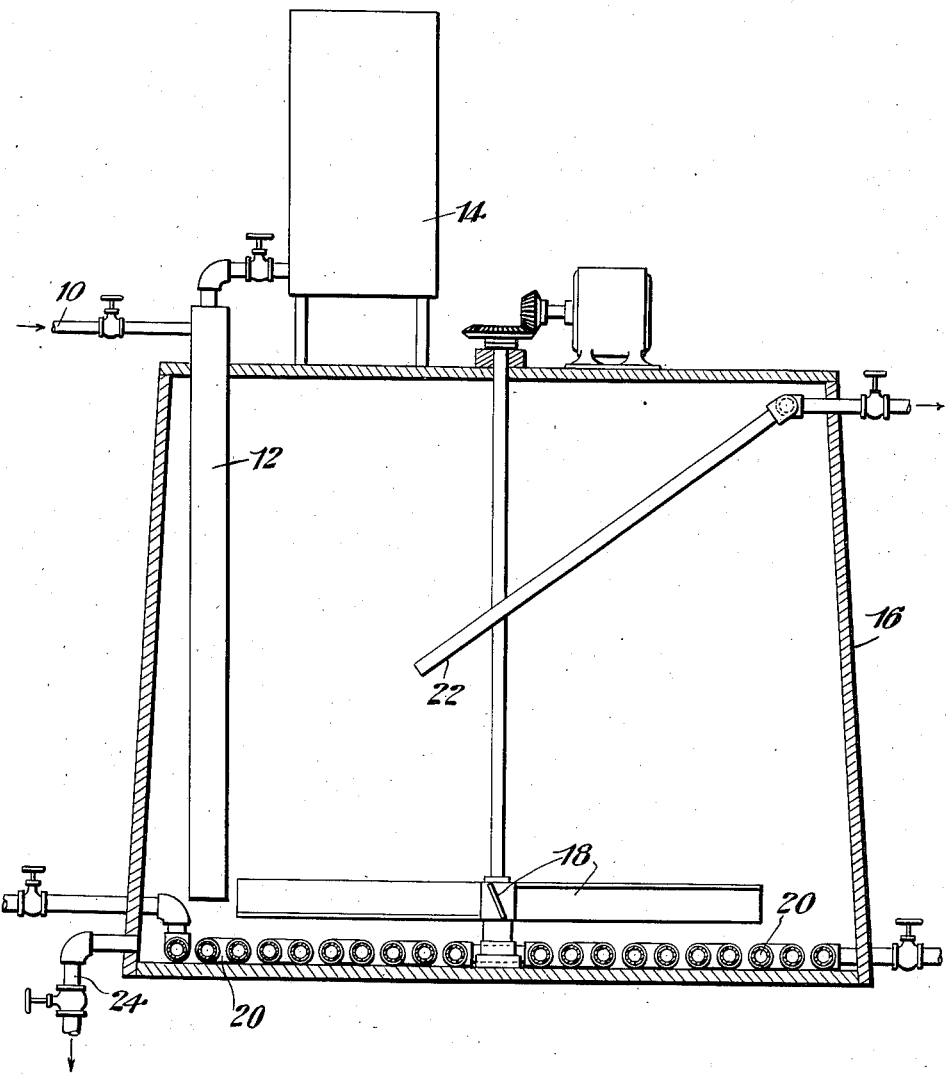

Patented May 7, 1935

2,000,725

UNITED STATES PATENT OFFICE 2,000,725

BREAKING OF OIL-WATER EMULSIONS

John Charles Walker, Eldorado, Kans., assignor, by mesne assignments, to The Tretolite Company, Webster Groves, Mo., a corporation of Missouri Application December 5, 1921, Serial No. 519,842

3 Claims. (Cl. 196—4)

This invention relates to the breaking of oil-water emulsions, and more particularly to a method of treating petroleum oil containing emulsion of oil and water to break the emulsion and separate the water from the oil.

The petroleum oil producing strata in most localities have water or brine associated with the oil. When the brine is agitated with the oil, as is commonly done by pumps, particularly defectively operating pumps, an oil-water emulsion is formed. The brine forms the disperse phase of the emulsion, and is distributed in the oil as particles varying in size from large drops to those of microscopic size, the particles being surrounded by films of oil.

The presence of emulsions in petroleum oil is undesirable because the wet oils or oils containing emulsions cannot be distilled or refined with the water in them. The presence of water in oil undergoing distillation causes the stills to froth and thus contaminates the distillates. Accordingly, the refineries and the pipe line companies refuse to buy oil which has more than a predetermined amount of an oil-water emulsion therein.

The oil-water emulsions formed from petroleums in different localities vary quite widely, and many different treatments have been used to break the different emulsions. The theory has been presented that the difference in emulsions is due to the difference in chemical compositions of the brines associated with the oils. There appears to be no doubt that the constituents of brine, particularly magnesium and calcium chlorides, tend to form permanent emulsions, but tests have shown that some oils will form a permanent emulsion with brine containing a low calcium and magnesium content as readily as with a brine containing a high calcium and magnesium content, while other oils will form permanent emulsion with either of these brines with difficulty.

When relying upon the theory that the differences in emulsions depend upon different characters of brines in the emulsions, certain chemical treatments of the wet oil have been used to break the emulsions. The chemical reagents are alleged to have water softening properties, and when they are brought into contact with the emulsions they are supposed to precipitate the salts in the brine and break down the disperse phase of the emulsions. Different chemical reagents therefore have been used to precipitate the salts, in accordance with the different characters of the brines in the emulsions.

Experiments tend to show, however, that permanent emulsions may be made by agitating oil with distilled water, or, with a salt solution which does not contain alkaline earth salts. Moreover, practically all brines associated with petroleum oils contain a sufficient quantity of salts such as the chlorides, sulphates and carbonates of calcium and magnesium, to form permanent emulsions with some kinds of oils. Also, many of the emulsions contain brines of approximately the same calicum and magnesium contents, but they vary quite widely in their resistance to breaking or splitting treatment. These facts appear to indicate that the difference in emulsions formed in different localities depends more on the different characters of the oils than upon the different characters of the brines associated with the oils.

The object of the present invention is to provide a method by which oil-water emulsions may be effectively broken, irrespective of the nature of oils and brines of which the emulsions are formed.

To dehydrate oil in accordance with the present invention, wet petroleum oil is thoroughly mixed with a solution or emulsion of a sulpho-fatty-acid. The mixture of the reagent and wet oil is then allowed to stratify and the water removed from the oil. Dehydration may be carried out at prevailing atmospheric temperatures but it is preferred to heat the oil to a temperature of from 90° to 150° F. when it is being mixed with the sulpho-fatty-acid because heat increases the effectiveness of the treating reagent, decreases the viscosity of the oil, aids in lowering the surface tension of the water and decreases the time required for stratification.

In the accompanying drawing is diagrammatically illustrated an apparatus in which the preferred form of the invention may be carried out.

To carry out the method above referred to in the illustrated apparatus petroleum oil containing an emulsion of oil and water is introduced through a pipe 10 into a distributor 12 where it is mixed with a solution of sulpho-stearic-acid introduced from a tank 14. The mixture of wet oil emulsion and treating reagent passes out of the distributor to the bottom of a treating tank 16 and is actively stirred by means of a series of stirring blades 18 positioned near the bottom of the tank 16. While the wet oil and treating reagent are being mixed by the stirrer 18 the mixture is also heated by means of steam in a coil 20 positioned in the bottom of the treating tank. When the tank has been filled with the wet oil and treating reagent the agitation and heating are continued for a period of thirty to sixty minutes and then the stirrer is stopped and the heating discontinued to permit the oil and water to stratify. After stratification has been completed the oil may be withdrawn by means of a swing pipe 22 and the water may be withdrawn through an outlet 24.

With the apparatus outlined above it will be seen that oil will be intermittently treated. This form of apparatus is very thorough and effective in breaking stubborn emulsions and is useful when the amount of emulsion to be treated is comparatively small. Where the amount of emulsion is large, an apparatus for treating continuously such as illustrated in my co-pending application, Serial No. 498,078, filed September 2, 1921, preferably would be used.

The treating reagent sulpho-stearic-acid may be prepared by treating commercial oleic acid with concentrated sulfuric acid at a temperature at or slightly below the boiling point of water. An excess of sulfuric acid is used to secure as complete sulfonation as is practicable and the acid is intermittently added in small amounts to avoid overheating of the solution and the liberation of excessive sulfur dioxide. Upon completion of the reaction the excess acid is removed by washing with water and the reagent is then ready for use in dehydrating oil. The reagent as thus prepared is a dark reddish viscous oil possessing a greasy odor and somewhat soluble in water, and forms an emulsion with water.

The quantity of reagent which should be used in breaking emulsions depends upon the character of the emulsion and the character of the oil forming the emulsion. Also, if the emulsion is recently formed it seems to break much more readily than an emulsion which has been standing in the air or in the bottom of an oil tank for a considerable period of time. The concentrated sulpho-stearic-acid treating agent will break the most stubborn petroleum emulsions when used in the amount of one-half to one per cent by volume of the wet oil being treated. Other forms of emulsions may be effectively broken when using one-tenth to five-tenths per cent of the volume of the wet oil being treated.

The action of the sulpho-fatty-acid in breaking the oil-water emulsions appears to be more of a physical or a physical-chemical nature than a true chemical nature. Experiments indicate that the oil-water emulsion has the brine for the disperse phase and the sulpho-fatty-acid will form an emulsion with water in which the fatty acid is the disperse phase. The disperse phase of the oil-water emulsion appears to have a negative electrical charge, and the disperse phase of the fatty-acid water emulsion appears to have a positive charge. Therefore, when the fatty-acid is applied to the oil-water emulsion the electrical charge of the oil-water emulsion appears to be neutralized, whereupon the emulsion is broken down and the water is permitted to coagulate. The sulpho-stearic-acid gives a marked change in the surface tension of the oil-water interface that disturbs the equilibrium existing between the continuous and disperse phases, and consequently tends to break down the emulsion. The sulpho-fatty-acid does not react with the calcium and magnesium salts usually found in petroleum emulsion to precipitate them.

It is possible also that the presence of the ionized sulpho-stearic-acid acts as a catalyst in destroying the equilibrium of the emulsion and thus causes the emulsion to break down. Sulphonated fatty acids have been shown by Ernst Twitchell to have a catalytic reaction when splitting fats to form glycerine and to set free fatty acids, and it may be that the sulphonated fatty acids act in a similar manner in breaking down emulsions.

While it is believed that the breaking of the oil-water emulsion with the sulphonated fatty acid is dependent on an action of a physical nature rather than upon a chemical nature, it is to be understood that the invention is not based, dependent upon, or limited to any theory except as specifically defined in the following claims.

In the claims the emulsions are referred to as comprising oil and water. By the term "water" it is intended to include the various brines or water solutions which are associated with oil in the oil producing strata. Also, in referring to the sulpho-stearic-acid it is not to be understood that this acid is chemically pure. The dehydration process does not require the use of a chemically pure reagent, and, preferably, commercial constituents are used in the manufacture of the sulpho-fatty acid. Further, no attempt is made to separate the sulpho-fatty-acid from any by-product which may be produced in the reaction, because the crude product is effective for the dehydration. In defining the treating reagent as sulpho-stearic-acid it is not to be understood that this is the exact constitution of the treating reagent.

Thus Twitchell, Lewkowitsch and other investigators have shown that when concentrated sulphuric acid in excess acts on an unsaturated fatty acid such as oleic acid, the product of the reaction, after washing out the excess sulphuric acid, always consists of a complex mixture containing in addition to the sulpho oleic acid, unacted on or unchanged oleic and iso-oleic acids, and other more or less complex by-products of the treatment including hydroxy stearic acid and fatty anhydrides such as stearolactone. (See the Journal of the American Chemical Society for 1900, pages 22 to 26; and the Journal of the Society of Chemical Industry, vol. 16 (1897) pages 389 to 394.) Commercial oleic acid or red oil contains small amounts of unsaponifiable matter and also neutral fats and solid fatty acids (5% to 20% palmitic, stearic and the like). A sulpho-stearic acid treating agent prepared in the manner above described contains solid fatty acids, sulpho-oleic or sulpho-stearic acid, and oleic acid bodies including oleic acid, hydroxy stearic acid, and non-saponaceous non-saponifiable fatty derivatives and anhydrides including stearolactone. The sulpho-oleic acid component of the reagent acts as a solubilizing agent to give a dispersion of the non-saponifiable components of the reagent in water. Similarly the oleic acid and other fatty acid components of the reagent act as a solubilizing agent to give a dispersion of the non-saponifiable components of the reagent in oil.

Although the method of dehydrating oil and the treating reagent have been referred to as particularly adapted for dehydrating petroleum oil emulsions, the method and treating reagent are not limited to such use, but may be effectively used in dehydrating other forms of emulsion.

The preferred form of the invention having been described, what is claimed as new is:

1. A process for breaking or separating petroleum emulsions, characterized by subjecting the emulsion to the action of a treating agent comprising a mixture of a substantial quantity of sulpho-oleic acid, oleic acid and stearolactone.

2. A process for recovering the oil of a petroleum emulsion, characterized by subjecting the emulsion to the action of a treating reagent comprising a mixture of a non-saponaceous, non-saponifiable, fatty derivative which bears a simple genetic relationship to its parent material and other saponifiable fatty bodies and derivatives.

3. A process for effecting the recovery of the oil of a petroleum emulsion, characterized by subjecting the emulsion to the action of a treating agent comprising a non-saponaceous, non-saponifiable, fatty derivative which bears a simple genetic relationship to its parent material, mixed with a water-soluble fatty derivative with an oil-soluble fatty body.

JOHN CHARLES WALKER.

CERTIFICATE OF CORRECTION.

Patent No. 2,000,725.                                                     May 7, 1935.

JOHN CHARLES WALKER

It is hereby certified that error appears in the printed specification of the above numbered patent requiring correction as follows: Page 3, second column, line 11, claim 3, after "derivative" insert the word and; and that the said Letters Patent should be read with this correction therein that the same may conform to the record of the case in the Patent Office.

Signed and sealed this 25th day of June, A. D. 1935.

(Seal)

Bryan M. Battey
Acting Commissioner of Patents.

CERTIFICATE OF CORRECTION.

Patent No. 2,000,725.  May 7, 1935.

JOHN CHARLES WALKER

It is hereby certified that error appears in the printed specification of the above numbered patent requiring correction as follows: Page 3, second column, line 11, claim 3, after "derivative" insert the word and; and that the said Letters Patent should be read with this correction therein that the same may conform to the record of the case in the Patent Office.

Signed and sealed this 25th day of June, A. D. 1935.

(Seal)

Bryan M. Battey
Acting Commissioner of Patents.